Aug. 19, 1958 V. C. SCHROEDER 2,848,283
BEARING ASSEMBLY FOR A HIGH ALTITUDE BOOSTER PUMP
Filed July 13, 1956 2 Sheets-Sheet 1
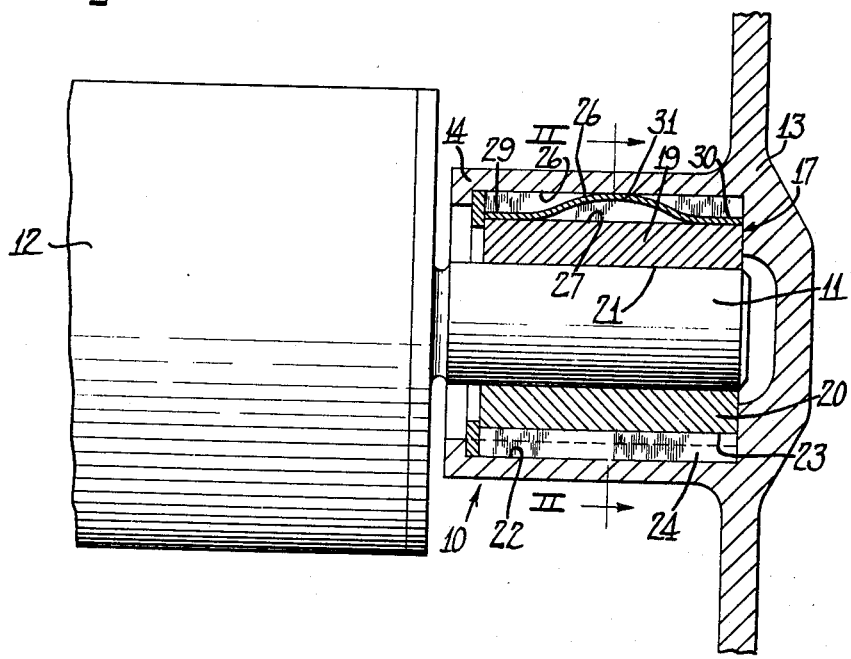
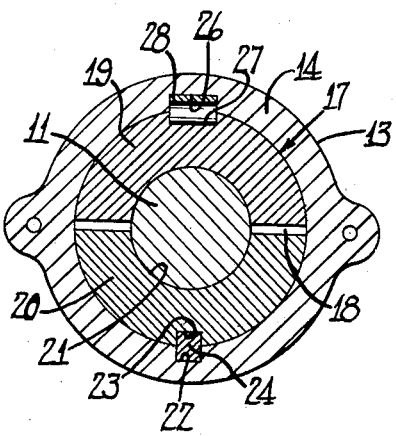
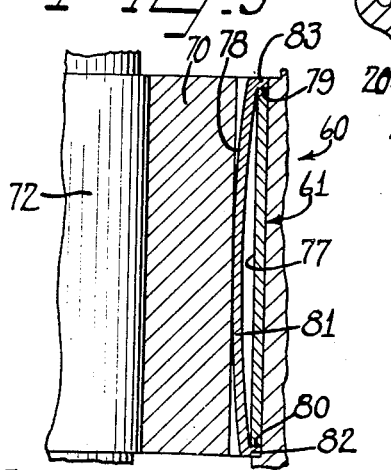
Inventor
Victor C. Schroeder
by Hill, Sherman, Meroni, Gross & Simpson Attys

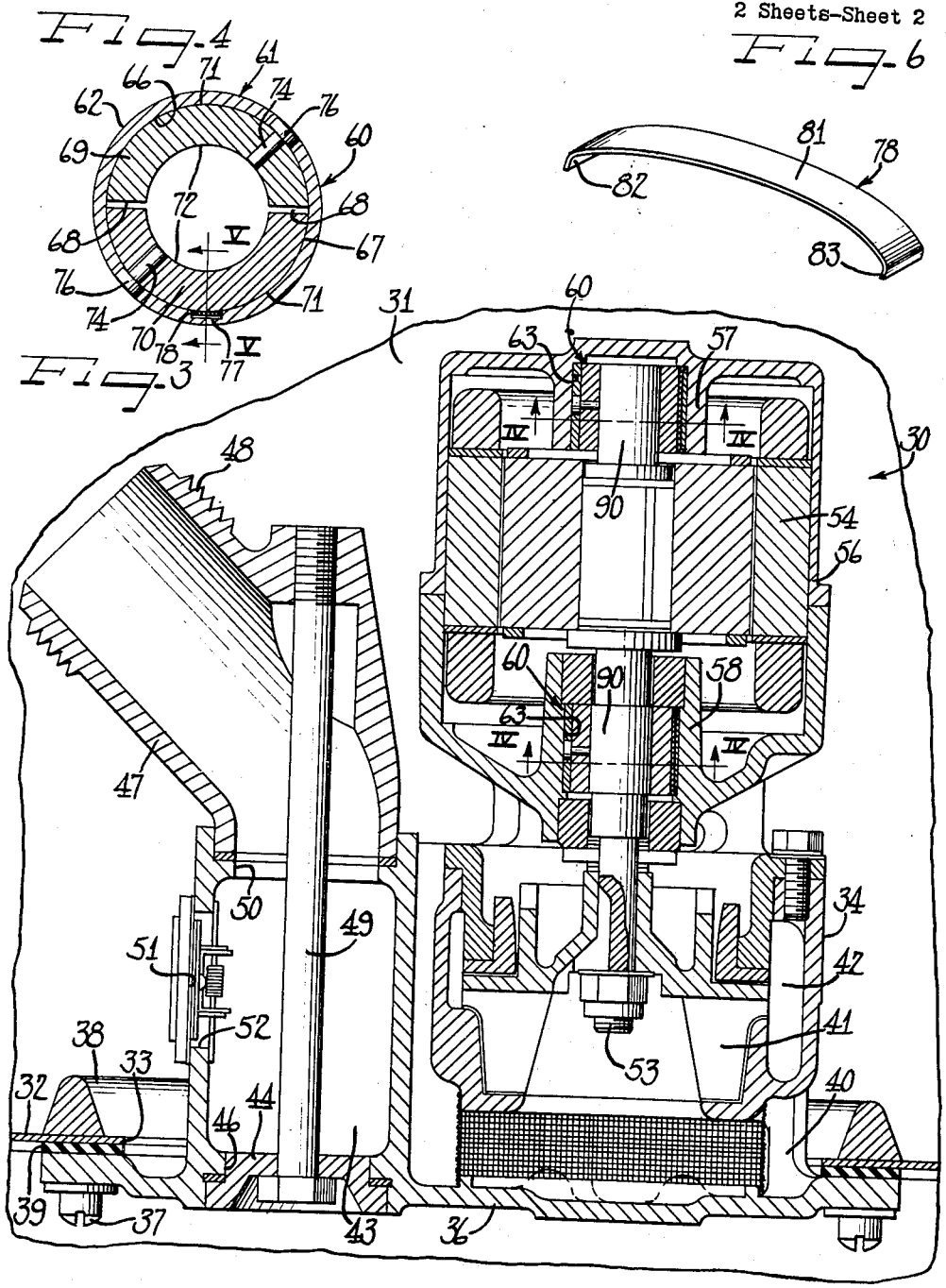

United States Patent Office 2,848,283
Patented Aug. 19, 1958

2,848,283

BEARING ASSEMBLY FOR A HIGH ALTITUDE BOOSTER PUMP

Victor C. Schroeder, Willoughby, Ohio, assignor to Thompson Products, Inc., Cleveland, Ohio, a corporation of Ohio Application July 13, 1956, Serial No. 597,637

3 Claims. (Cl. 308—63)

This invention relates generally to bearing assemblies and more particularly to a bearing assembly for a high altitude booster pump.

Although the principles of the present invention are of general utility, a particularly useful application is made when the bearing assembly of the present invention is applied to a fuel booster pump such as is employed in the fuel system of aircraft. Altitude and speed ranges of contemporary aircraft are ever on the increase and there is a distinct need for a fuel booster pump capable of running dry at high altitudes for prolonged periods of time.

The present invention contemplates the utilization of a bearing construction which will insure the successful operation of a booster pump at a high altitude even though the pump is required to run dry for an extended period of time.

It is an object of the present invention, therefore, to provide a booster pump which is capable of successful operation at higher altitudes than have heretofore been possible.

Another object of the present invention is to provide an improved booster pump and bearing assembly wherein high altitude dry-running can be successfully accomplished.

Yet another object of the present invention is to provide a bearing construction which will journal a rotatable part for dry-running.

Another object of the present invention is to provide a bearing assembly which will run dry without excessive damage or wear.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

Figure 1 is a fragmentary view cross-sectional in part illustrating a bearing assembly embodying the principles of the present invention;

Figure 2 is a cross-sectional view taken generally on line II—II of Figure 1;

Figure 3 is a fragmentary cross-sectional view of a submerged aircraft fuel booster pump equipped with a bearing assembly provided in accordance with the principles of the present invention;

Figure 4 is a cross-sectional view taken generally on line IV—IV of Figure 3;

Figure 5 is a fragmentary cross-sectional view taken generally on line V—V of Figure 4; and Figure 6 is an isometric view of the spring strip incorporated in the bearing assembly of Figures 3, 4, and 5.

As shown on the drawings:

A bearing assembly is indicated in Figure 1 generally by the reference numeral 10 and is adapted to rotatably journal a rotatable part 11 which may conveniently comprise a rotatable shaft part attached to a driving source such as a motor 12. An enclosure means such as a housing or retainer is indicated generally at 13 and includes a sleeve portion 14 generally coextensive in longitudinal extent with a bearing sleeve indicated generally at 17.

In accordance with the principles of the present invention, the bearing sleeve 17 is longitudinally split as at 18 to form separate parts. In the form of the invention illustrated in Figures 1 and 2, the bearing sleeve 17 is split along its length to form halved parts indicated respectively at 19 and 20, which together form at the inner peripheral surfaces thereof a bearing surface 21 for rotatably journaling the shaft 11.

The retainer sleeve portion 14 is grooved as at 22 and the bearing part 20 is correspondingly grooved as at 23, the grooves 22 and 23 confronting one another and being sized and shaped to receive a key member 24 preventing relative rotation between the enclosure means and the bearing part 20.

The retainer sleeve portion 14 is also grooved as at 26 and the bearing part 19 is correspondingly grooved as at 27, the grooved parts confronting one another and receiving therein a continuous biasing means taking the form of a spring strip 28 having flat end portions 29 and 30 and a center bowed portion 31. The flat end portions 29 and 30 of the spring strip 28 engage against the outer peripheral surface of the bearing part 19 in the groove 27, while the bowed center portion 31 engages against the inner peripheral surface of the retainer sleeve portion 14 in the groove 26, thereby exerting a continuous biasing force loading the bearing part 19 radially inwardly against the shaft part 11.

By virtue of the structure thus provided, a dry-running bearing construction is provided which will not chatter and which minimizes frictional interferences.

Referring now to Figures 3–6, a bearing construction in accordance with the principles of the present invention is shown applied to a high altitude booster pump. The booster pump is indicated generally in Figure 3 by the reference numeral 30 and is arranged for submerged mounting in a fuel cell 31. The fuel cell 31 has a bottom wall 32 provided with an opening 33 through which extends a pump casing 34. A cover portion 36 has flanges overlying the edges of the opening 33 and suitable fastening means 37 engage a retainer ring 38 positioned on the inside of the fuel cell 31. A sealing gasket 39 seals the joint between the bottom wall 32 and the booster pump 30.

The booster pump 30 has a bottom inlet indicated generally at 40 through which fuel is supplied to a center inlet impeller 41, the fuel advancing axially and being discharged centrifugally into a volute 42 for delivery to an outlet 43. The outlet 43 is adapted for outside or inside discharge and in the form of the invention illustrated, a plug 44 closes the outside discharge opening 46 and a conduit fitting 47 having suitable thread means 48 formed thereon for connection to conduit means (not shown) is retained by a bolt 49 in communication with an inside discharge port 50. A check valve 51 controls an aperture 52 leading from the fuel cell 31 back into the pump outlet 43 permitting fuel to flow from the fuel cell 31 through the check valve 51, into the pump outlet 43, and the outfitting 47, allowing the fuel to by-pass the pumping parts of the booster pump assembly 30 with a minimum loss in pressure in case of pump failure.

The impeller 41 is rotatably driven by a power take-off shaft 53 to which the impeller 41 is connected, the power take-off shaft 53 being driven by an electric motor 54 enclosed within a motor casing 56 mounted in integral assembly with the pump casing 34.

The casing components of the apparatus provide a pair of bearing bosses 57 and 58 which are longitudinally spaced from one another and which are adapted to provide bearing support at longitudinally spaced points for the shaft 53. Within the bearing bosses 57 and 58, the bearing assembly of the present invention is located, each of the bearing assemblies being indicated generally by the reference numeral 60. Each of the bearing assemblies 60 is identical and one description will suffice for both, common reference numerals being applied to all common parts.

The bearing assembly has a retainer sleeve 61 which is generally of tubular or cylindrical configuration, thereby to provide an outer peripheral surface 62 which engages against the adjoining walls 63 of the corresponding boss portion 57 or 58 and a through bore providing an inner surface 66. Within the retainer sleeve 61 there is provided a bearing sleeve indicated generally at 67 longitudinally split as at 68 to provide a plurality of separate parts. In the embodiment herein illustrated, the bearing sleeve 67 is split along its length to form halved parts indicated at 69 and 70, respectively.

The halved parts 69 and 70 are generally similar and are semicylindrical in cross-section, each of the parts 69 and 70 having an outer surface 71 for engaging the inner surface 66 of the retainer sleeve 61 and having an inner surface 72 forming a bearing and journaling surface for the shaft 53.

A pin 74 headed as at 76 is received by each respective part 69 and 70, the headed portion 76 of each pin 74 being received in the retainer sleeve 61, thereby to prevent relative rotation between the bearing parts 69 and 70 and the retainer sleeve 61.

As shown in Figures 4 and 5, the retainer sleeve 61 has a slot 77 formed on its inner peripheral surface in which is received a continuous biasing means indicated generally at 78 and thereby being operatively interposed between the retainer sleeve 61 and the bearing part 70 to load the bearing part 70 radially inwardly against the shaft 53.

The retainer sleeve 61 is notched at the ends of the groove 77 as indicated at 79 and 80, respectively, thereby to receive the specific form of continuous biasing means 78 illustrated in the embodiment of Figures 4 and 5. Thus, the continuous biasing means 78 comprises a spring strip arcuately bowed throughout a body portion 81, as shown in Figure 6, and having at its end extremities offset lug portions 82 and 83, respectively, each lug portion being received in one of the notches 80 and 79.

It will be understood, therefore, that the bowed center portion 81 of the spring strip or continuous biasing means 78 will engage against the outer peripheral surface 71 of the bearing part 70, while the ends of the spring strip or continuous biasing means 78 will engage against the retainer sleeve 61, thereby radially loading the bearing part 70 inwardly against the shaft 53.

To insure the efficiency of the bearing assembly, it is contemplated, in accordance with the principles of the present invention, to provide on the shaft 53 a surface portion indicated at 90 and running within the bearing parts 69 and 70 which is chrome-plated and superfinished, thereby to provide a smooth surface to be journaled. Moreover, it is further contemplated that the bearing parts 69 and 70 will be made of any suitable carbon ring material. The retainer sleeve 61 and the spring strip 78 may conveniently comprise a stainless steel material.

By virtue of the provision thus made, prolonged dry-run operation of the booster pump at high altitude is possible.

Although various minor modifications might be suggested by those versed in the art, it should be understood that I wish to embody within the scope of the patent warranted hereon all such embodiments as reasonably and properly come within the scope of my contribution to the art.

I claim as my invention:

1. In an aircraft fuel pump, a casing having fuel lubricated bearing means alternately subject to wet and dry operation, a rotatable shaft in said bearing means having a peripheral super finished coating forming a surface having a low coefficient of friction for running in said bearing means, said bearing means comprising a bearing sleeve made of carbon ring material and split along its length to form segmental bearing parts, each of said bearing parts having an inner bearing surface together forming a journal surface for engaging said coating on said shaft, a circumferentially continuous retainer sleeve surrounding said bearing sleeve, and a spring strip bowed to engage against the outer surface of an adjoining one of said segmental bearing parts and the inner surface of said retainer sleeve to load said bearing part radially inwardly, said spring strip and said retainer sleeve comprising stainless steel material, whereby prolonged dry-run operation of said pump can be effected.

2. In an aircraft fuel pump, a casing having fuel lubricated bearing means alternately subject to wet and dry operation, a rotatable shaft in said bearing means having a peripheral super finished coating forming a surface having a low coefficient of friction for running in said bearing means, said bearing means comprising a bearing sleeve made of carbon ring material split along its length to form segmental bearing parts, each of said bearing parts having an inner bearing surface together forming a journal surface for engaging said coating on said shaft, a circumferentially continuous retainer sleeve surrounding said bearing sleeve, said retainer sleeve having a longitudinally extending groove formed in the inner surface thereof, and a spring strip having a body portion arcuately bowed and having offset lug portions formed at its extremities, said retainer sleeve having notches formed at the ends of said groove to receive the corresponding lug portions, whereby the bowed body portion will engage the outer surface of an adjoining segmental bearing part to load the same radially inwardly while the ends of the spring strip will be retained in said notches, said spring strip and said retainer sleeve comprising stainless steel material, whereby prolonged dry-run operation of said pump can be effected.

3. An aircraft fuel pump as defined in claim 1 in which said retainer sleeve and one of said segmental bearing parts have confronting longitudinal grooves formed therein receiving and seating said spring strip therein.

References Cited in the file of this patent

UNITED STATES PATENTS

| | | |
|---|---|---|
| 2,179,824 | Kip | Nov. 14, 1939 |
| 2,312,526 | Curtis | Mar. 2, 1943 |

FOREIGN PATENTS

| | | |
|---|---|---|
| 12,514 | Great Britain | 1897 |